United States Patent
Valentine et al.

(10) Patent No.: US 10,261,171 B2
(45) Date of Patent: *Apr. 16, 2019

(54) COMBINED DISPLAY OF RADAR SIGNAL DIRECTION AND STRENGTH

(71) Applicant: Valentine Research, Inc., Cincinnati, OH (US)

(72) Inventors: Michael D. Valentine, Cincinnati, OH (US); Gary E. Carrelli, Cincinnati, OH (US); Richard L. Dickerson, Union, KY (US); Michael Negussu, Cincinnati, OH (US); Stephen R. Scholl, Cincinnati, OH (US)

(73) Assignee: Valentine Research, Inc., Cincinnati, OH (US)

( * ) Notice: Subject to any disclaimer, the term of this patent is extended or adjusted under 35 U.S.C. 154(b) by 673 days.

This patent is subject to a terminal disclaimer.

(21) Appl. No.: 14/827,768

(22) Filed: Aug. 17, 2015

(65) Prior Publication Data
US 2016/0154090 A1 Jun. 2, 2016

Related U.S. Application Data

(63) Continuation of application No. 13/571,636, filed on Aug. 10, 2012, now Pat. No. 9,110,149.

(51) Int. Cl.
*G01S 7/02* (2006.01)
*G01S 7/48* (2006.01)
*G01S 7/04* (2006.01)

(52) U.S. Cl.
CPC ............ G01S 7/022 (2013.01); G01S 7/04 (2013.01); G01S 7/4806 (2013.01)

(58) Field of Classification Search
CPC .......... G01S 7/022; G01S 7/04; G01S 7/4806
USPC .......................................................... 342/20
See application file for complete search history.

(56) References Cited

U.S. PATENT DOCUMENTS

| | | | |
|---|---|---|---|
| 5,151,701 A | 9/1992 | Valentine et al. | |
| 5,206,651 A | 4/1993 | Valentine et al. | |
| 5,300,932 A * | 4/1994 | Valentine | G01S 3/18 342/20 |
| 5,668,554 A * | 9/1997 | Orr | G01S 7/022 342/176 |
| 6,441,773 B1 | 8/2002 | Kelly et al. | |
| 7,109,913 B1 | 9/2006 | Paramore et al. | |
| 7,450,051 B1 | 11/2008 | Valentine et al. | |
| 9,110,149 B2 * | 8/2015 | Valentine | G01S 7/022 |

OTHER PUBLICATIONS

Xirrus Wi-Fi Monitor Widget for Windows XP Guide, 6 pages, Jun. 23, 2008, http://cdn.xirrus.com/pdf/xirruswifimonitorXPwidgetguide1-1.aspx.

(Continued)

*Primary Examiner* — Timothy A Brainard
(74) *Attorney, Agent, or Firm* — Stevens & Showalter, LLP (57) ABSTRACT

A device includes a radar signal detector that can determine a signal strength of a police radar signal and a direction of a source of the police radar signal. Additionally, the device includes a display in communication with the radar signal detector that provides a single display region having a visual appearance which varies based on both the direction and on the signal strength.

12 Claims, 11 Drawing Sheets

(56) References Cited

OTHER PUBLICATIONS

Wind Rose, 3 pages, Jan. 2008-Aug. 2014, Wikipedia, http://en.wikipedia.org/wiki/Wind_rose.
Garmin GWX 68 digital color weather radar, 2 pages, 2010, http://www8.garmin.com/aviation/brocures/10127GWX68/M021012000910.pdf.

* cited by examiner

COMBINED DISPLAY OF RADAR SIGNAL DIRECTION AND STRENGTH

CROSS-REFERENCE TO RELATED APPLICATIONS

This application is a continuation of U.S. patent application Ser. No. 13/571,636, issued as U.S. Pat. No. 9,110,149, entitled Combined Display of Radar Signal Direction and Strength, filed Aug. 10, 2012, the entire disclosure of which is incorporated by reference herein.

FIELD OF THE INVENTION

The present invention relates generally to police radar detectors used in motor vehicles and, more particularly, to compactly displaying information about detected radar signals.

BACKGROUND

Radar signals have been commonly used by police for some time to determine the speed of motor vehicles. In response to radar speed monitoring and to signal motor vehicle operators when such monitoring is taking place, police radar detectors have likewise been used for almost a coincident period of time. Currently available radar detectors indicate the presence of radar signals, the frequency band of detected signals, the direction from which the radar signals originate and the relative field strength of detected signals. In addition, the current radar detectors can also display information about their current mode of operation and the number of detected radar signals at any given time. The widely varying operating procedures for using police radar and the proliferation of other signals assigned to the same frequency bands as police radar has led to the need for police radar detectors which give more information than has been contemplated in the past.

For example, police radar units are often deployed along the side of the roadway, to measure a motor vehicle's speed as it advances toward the unit. In some instances, the police radar may measure the speed of a motor vehicle after it has passed and is travelling away from the unit. Police vehicles may also be equipped with radar units which are operated while the police vehicles are moving, using reflections from stationary objects to measure the speed of the police vehicle itself, and reflections from a target vehicle to measure relative speed, and using both measured speeds to determine the actual speed of the target vehicle.

When a vehicle equipped with a radar detector is within microwave range of a police radar unit which transmits a radar signal, the detector alerts the vehicle operator that the signal is present typically through a combination of audible and visual signals. As the user approaches the source of the radar signal, signal strength of the detected radar signal typically increases. As the vehicle passes the source of the radar signal, the indicated signal strength drops, usually very quickly, since a forwardly aimed directional antenna of the detector is no longer pointed in the general direction of the signal source, and is now responding to reflections of the signal from objects in front of the vehicle. If the police radar unit is at the side of the road in a clearly visible location, the vehicle operator can easily correlate the detected signal and its apparent source.

Often, a driver using a radar detector may be travelling at a relatively high rate of speed and would benefit from receiving all the available information about a detected radar signal as quickly and concisely as possible. Thus, there remains a need for police radar detectors that efficiently and effectively convey as much information to a driver as easily and quickly as possible.

SUMMARY

Accordingly, aspects of the present invention relate to a device that includes a radar signal detector that can determine the strength of a police radar signal and the direction of a source of the police radar signal. Additionally, the device includes a display in communication with the radar signal detector that provides a single display region having a visual appearance which varies based on both the direction of the source and on the strength of the signal.

Additional aspects of the present invention relate to a method for displaying a plurality of attributes of a detected radar signal. In accordance with this method, the strength of the detected radar signal and the direction of a source of the detected radar signal are determined and then a visual indication of the plurality of attributes of the detected radar signal is displayed in a single display region having a visual appearance which varies based on both the direction of the source and on the strength of the signal.

Other aspects of the present invention relate to an apparatus that includes a radar signal detector configured to determine a signal strength of a police radar signal and a direction of a source of the police radar signal. Additionally, the device includes a display in communication with the radar signal detector that is configured to display an icon having a visual appearance which varies based on both the direction and on the signal strength.

BRIEF DESCRIPTION OF THE DRAWINGS

While the specification concludes with claims particularly pointing out and distinctly claiming the present invention, it is believed that the present invention will be better understood from the following description in conjunction with the accompanying Figures, in which like reference numerals identify like elements, and wherein:

DETAILED DESCRIPTION

In the following detailed description of the preferred embodiment, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of the present invention.

As previously noted, aspects of the present invention relate to a motor vehicle radar detector which not only detects the presence of radar signals incident on a motor vehicle, but also determines a signal strength associated with those detected signals and determines a direction of a source of the radar signals. Furthermore, such a radar detector provides a display that alerts the operator of the motor vehicle of both the source direction or angular orientation of the radar signal source relative to the motor vehicle and the strength of the detected signal. When the radar detector is aligned substantially in the same direction as the motor vehicle, the direction of the source relative to the detector is the same as that relative to the motor vehicle (e.g., in front of, to the rear of, to the side of, etc.).

An exemplary radar detector capable of detecting radar signal strength and the direction of the radar signal source is fully described in U.S. Pat. No. 5,083,129, which is assigned to the same assignee as the present application and is incorporated herein by reference in its entirety. Also, a multi-band radar detector capable of determining a relative direction of a radar source is more fully described in U.S. Pat. No. 7,450,051, which is assigned to the same assignee as the present application and is incorporated herein in its entirety.

Figure 1:
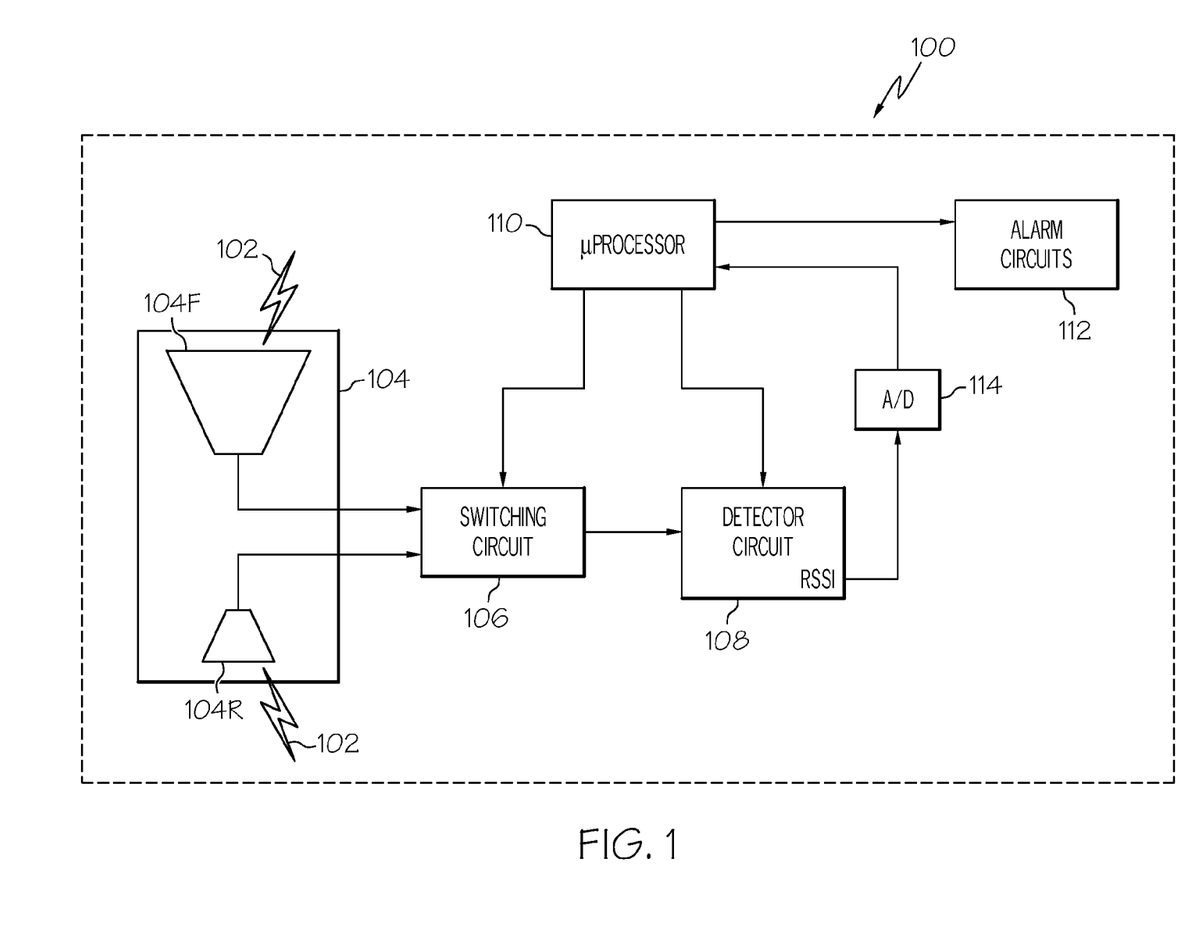
FIG. 1 provides a high-level functional block diagram of a police radar detector.

FIG. 1 provides a high-level functional block diagram of a police radar detector similar to those described in the above-referenced, and incorporated, patents. The radar detector 100 of FIG. 1 monitors one or more police radar bands to sense radar signals 102 incident upon a receiver that comprises antennas 104 (e.g., a generally forwardly directed antenna 104F and a generally rearwardly directed antenna 104R). While the antennas 104F, 104R are illustrated as generally facing the front and the rear of a vehicle that includes the detector 100, it is to be understood that the antenna directions can be different for given applications and as a result of existing or future requirements. Signals received by the antennas 104F, 104R are passed to a switching circuit 106. The switching circuit 16 can connect signals from the antennas 104F, 104R to a detector circuit 108 which can generate radar identification signals identifying incoming radar signals. The detector circuit 108 can differentiate between likely police radar signals and nuisance radar signals emanating from other radar sources.

In FIG. 1, the detector circuit 108 comprises any appropriate radar detector circuit 108 capable of generating a received signal strength indicator (RSSI) output signal which indicates the signal strength of radar signals detected by the detector circuit 108. The RSSI output signal can be digitized using an analog-to-digital converter 114 before being communicated to a microprocessor 110. The switching circuit 106 and radar detector circuit 108 can take a wide variety of forms and can include amplifiers, mixers, diplexers, and other circuitry commonly used in the radar detector field as are well known to those skilled in the art.

A microprocessor 110, or similar processing device, controls the switching circuit 106 to selectively connect signals from the antennas 104F and 104R to the detector circuit 108. Operation and control of the detector circuit 108, for example for the detection of radar signals in different frequency bands allocated to police radar signals, are also performed by the microprocessor 110. The microprocessor 110 additionally controls alarm circuits 112 to communicate information regarding detected radar signals to the operator of a motor vehicle utilizing the detector 100 by means of one or more alarm tones and/or visual indicators which are included within the alarm circuits 112 and more fully described below. In particular, the microprocessor 110 can generate control signals for the alarm circuits 112 and any visual displays.

Figure 2:
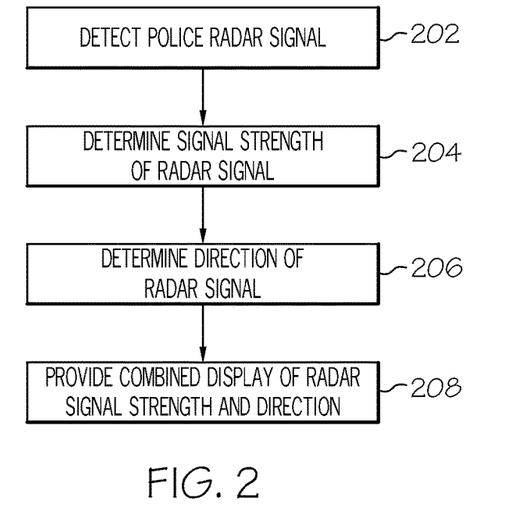
FIG. 2 depicts a flowchart of an exemplary method of displaying radar signal information in accordance with the principles of the present invention.

FIG. 2 depicts a flowchart of an exemplary method of displaying radar signal information in accordance with the principles of the present invention. In particular, a police radar detector is operated to scan a number of different bands of frequencies related to police radar sources. In step 202, the antennas, detector circuit, and signal processing circuits detect that a radar signal is present that likely corresponds to a police radar signal. The detector circuit of the police radar detector can, in step 204, determine a particular signal strength associated with the detected radar signal.

Based on the radar signal characteristics received by differently oriented antennas, the radar detector, in step 206, can also determine a direction from which the detected radar signal originated. In particular, a direction can be determined relative to a vehicle in which the radar detector is operating. For example, the direction from which the detected radar signal originated can be referred to as "from in front of the vehicle", "to the side of the vehicle", and/or "from behind the vehicle".

The microprocessor of the radar detector can then generate control signals for activating the different alert and alarms circuits that inform a vehicle operator of the presence of the detected radar signal and its various attributes. In particular, the microprocessor, in step 208, can generate control signals for visual display circuits of the radar detector and provide those control signals to the display circuits.

Figure 3:
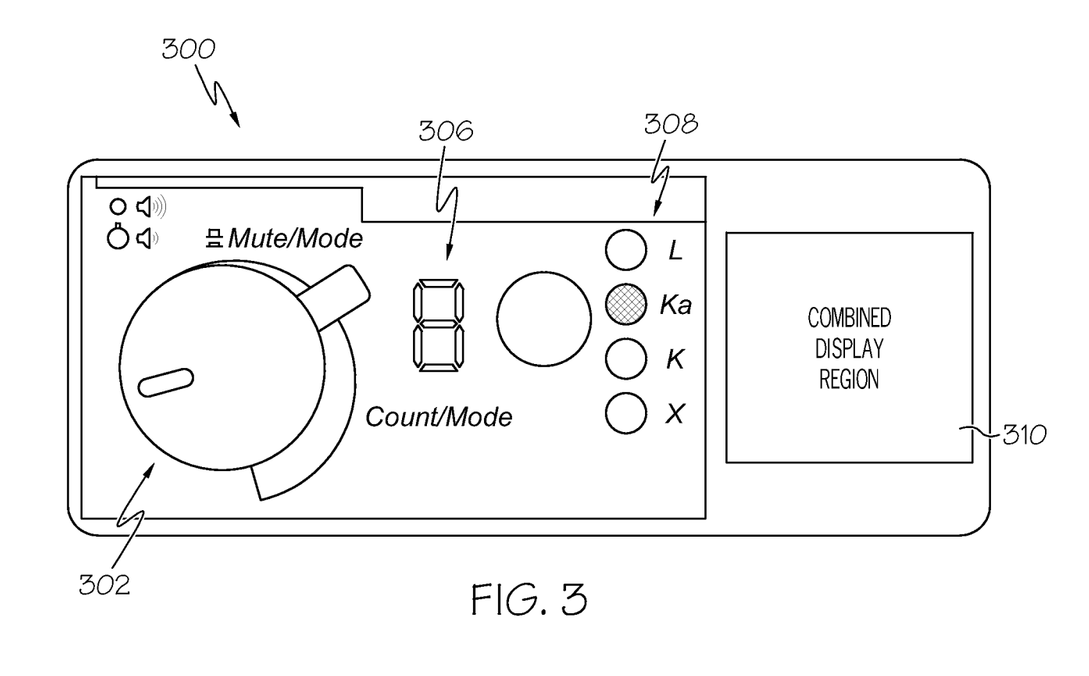
FIG. 3 depicts a view of an exemplary radar detector front panel in accordance with the principles of the present invention.

FIG. 3 depicts a view of an exemplary radar detector front panel in accordance with the principles of the present invention.

In FIG. 3, a front panel 300 of the detector 100 includes one or more user-adjustable controls 302, a count/mode indicator 306 illustrated as a 7-segment display, a band indicator 308 and a display 310 configured to provide a combined signal strength and direction indicator. Herein, the display 310 is generally referred to as a combined display region. A user, or driver, can set the user-adjustable controls 302 to user-defined preferences, e.g., to control the volume of audible alarms, to control the sensitivity of the antenna, etc. The count/mode indicator 306 can provide a count of the number of detected signals and can also provide operating mode information to the user. The band indicator 308 can provide an indication of a particular radar band of detected radar signals. The combined display region 310 provides both a visual representation of the relative strength of detected radar signals to the user and a visual indication of the direction of the detected signals. In other words, the visual appearance of the combined display region 310 varies based on both the signal strength and the direction. Thus, a single portion or region 310 of a display of the front panel 300 is configured to simultaneously provide a visual indication of both signal strength and signal or signal source direction to a user. The front panel 300 is merely illustrative and other features or manners of display may be implemented.

One of ordinary skill will recognize that embodiments of the present invention contemplate a variety of different ways to arrange a signal strength indicator and a signal direction indicator within a single visible region of a radar detector display. However, FIGS. 4A-4F are provided by way of example, and not of limitation, of how such a concurrent display can be accomplished. Thus, FIGS. 4A-4F depict concurrent display of a signal strength indicator and a signal direction indicator in accordance with the principles of the present invention. In the description below, reference is made to one or more visual indicators that are activated to provide a user with a visual indication of one or more properties related to a detected radar signal. The visual indicators can comprise multiple segments of light emitting diodes (LEDs), one or more liquid crystal display (LCD) elements, incandescent light bulbs, or pixel-based display screens similar to a computer monitor or television. The elements which comprise the display can be back-lit and/or illuminated so as to be visible in different light conditions within the vehicle.

Figure 4A:
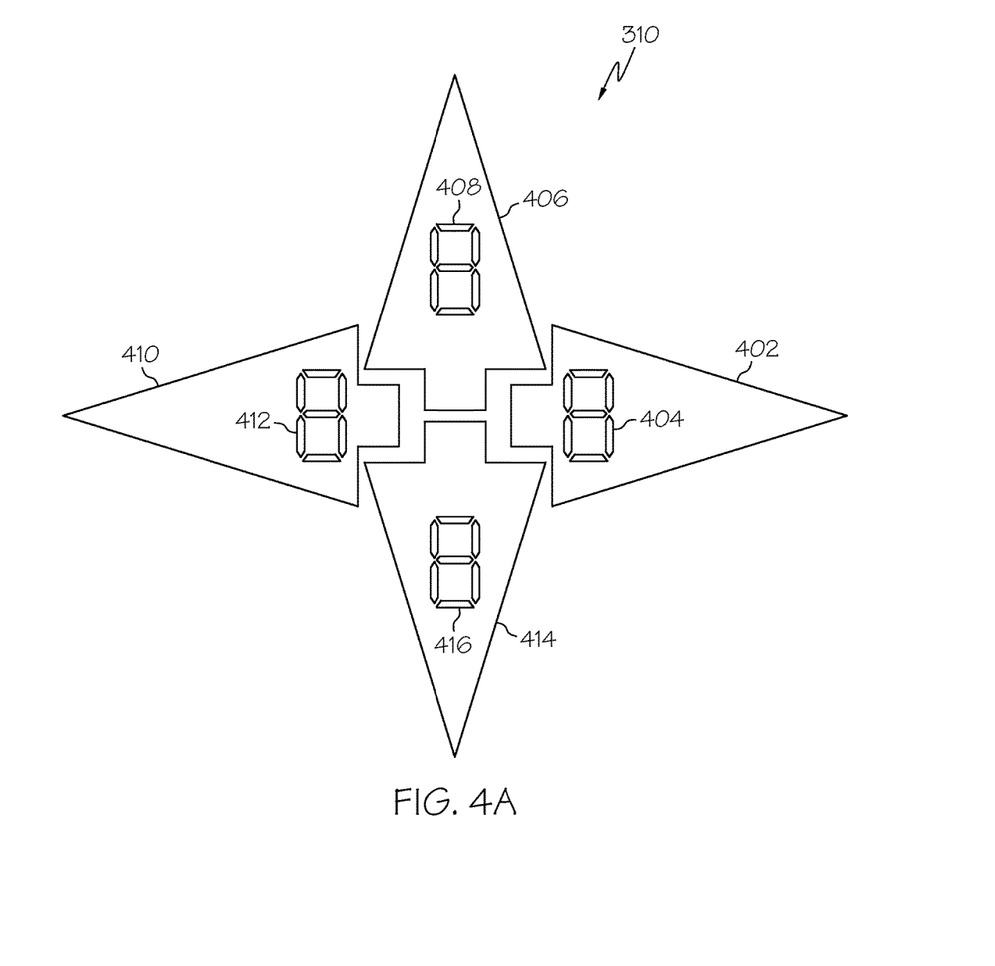
FIGS. 4A-4F depict concurrent display of a signal strength indicator and a signal source direction indicator in a single portion of a display in accordance with the principles of the present invention.

In FIG. 4A there are four directional arrows 402, 406, 410 and 414 that can be illuminated and that respectively represent source directions corresponding to the right of the radar detector, in front of the radar detector, to the left of the radar detector, and to the rear of the radar detector. Overlapping each of the four directional arrows is a respective signal strength indicator. In the example of FIG. 4A, each respective signal strength indicator can be a 7-segment display such that display 404 is associated with directional arrow 402, display 408 is associated with directional arrow 406, display 412 is associated with directional arrow 410, and display 416 is associated with directional arrow 414. The four directional arrows 402, 406, 410, and 414 as well as the four 7-segment displays 404, 408, 412, and 416 comprise the combined display region 310.

In operation, the microprocessor 100 of the radar detector 100 will determine, based on the detected radar signals, the correct control signals to activate the correct directional arrow and the correct 7-segment display. Furthermore, a value displayed by the 7-segment display will reflect a signal strength of the detected radar signal. For example, if a radar signal is detected from the rear of the radar detector and has a scaled signal strength of 4-out-of-10, then the directional arrow 414 will be illuminated and the 7-segment display 416 will become active and display the value "4".

Figure 4B:
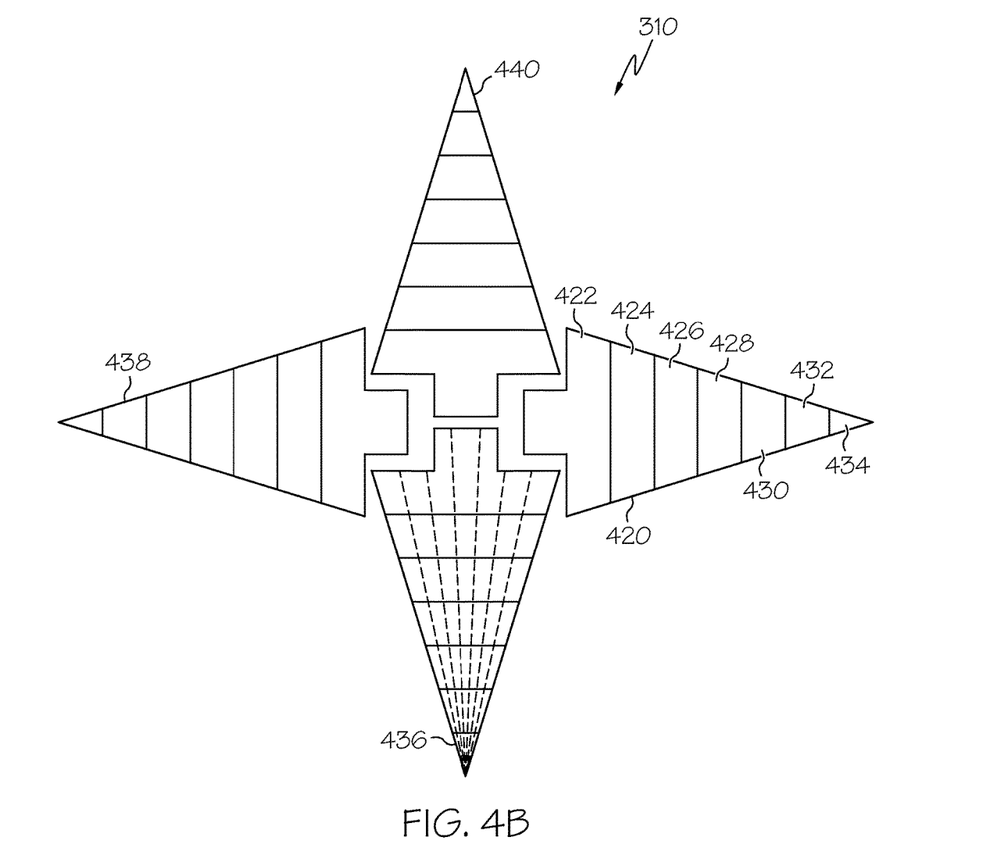

FIG. 4B depicts another combined signal strength indicator and signal direction indicator in accordance with the principles of the present invention. Similar to the combined display region of FIG. 4A, the combined display region 310 of FIG. 4B includes four directional arrows 420, 436, 438, and 440 each corresponding to a respective direction relative to the radar detector. Because all four directional arrows can operate in a substantially similar manner, only the operation of one directional arrow (e.g., arrow 420) will be described.

The directional arrow 420 is comprised of multiple segments 422-434. In the example of FIG. 4B, the number of segments happens to be 7; however, one of ordinary skill will recognize that the number of different segments can be varied without departing from the scope of the present invention. The inner-most segment 422 can correspond to a first signal strength level and the adjacent segment 424 can correspond to a second signal strength level, wherein the second signal strength level is greater than the first signal strength level. This correlation between segments and respective signal strength levels can continue such that an outermost segment 434 corresponds to a highest signal strength level. In operation, if a detected signal strength corresponds to the signal strength level, for example, of segment 428, then all segments corresponding to a signal strength level below or equal to the detected signal strength may be illuminated. Accordingly, segments 422, 424, 426, and 428 would be illuminated while segments 430, 432, and 434 would not be illuminated.

Thus, the microprocessor 110 of the radar detector 100 can determine, based on the detected radar signals, the correct control signals to activate the correct directional arrow (e.g., 420, 436, 438, or 440) based on a relative direction of the detected radar signal. Furthermore, based on a signal strength of the detected radar signal the appropriate segments (e.g., 422-434) of the directional arrow can be illuminated.

One of ordinary skill will recognize that the correspondence between signal strength and segments can be altered without departing from the intended scope of the present invention. For example, segment 434 may correspond to a lowest signal strength level and segment 422 can correspond to a highest signal strength level. In this alternative, a detected signal having a very low signal strength would result in only segment 434 being illuminated. Also, the segments can be aligned with the directional arrow as shown by the dotted lines in the directional arrow 436 in FIG. 4B.

Figure 4C:
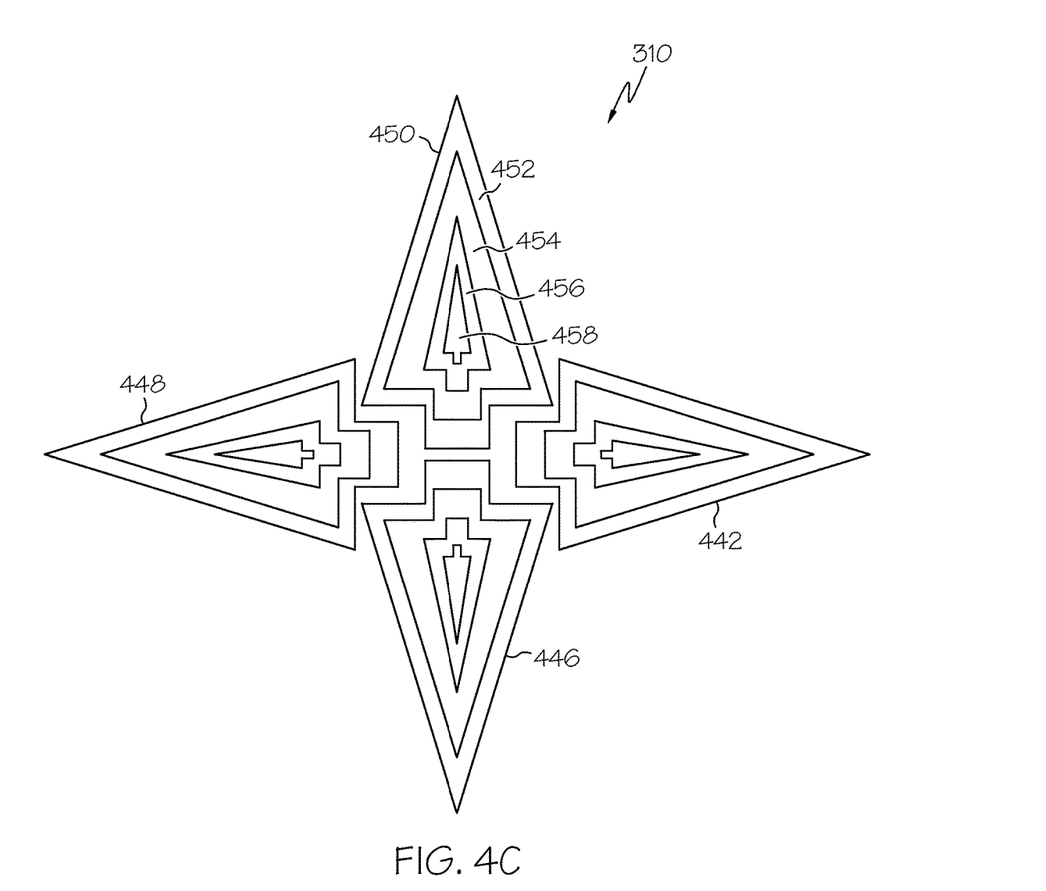

FIG. 4C is conceptually similar to the combined display portion of FIG. 4B. There are four directional arrows 442, 446, 448, and 450. Each such directional arrow is comprised of multiple, nested arrow segments such as, for example, arrow segments 458, 456, 454, and 452. In this example, the control signals from the microprocessor 110 will select the appropriate arrow segments of the appropriate directional arrow to illuminate. For example, if a relatively weak radar signal is detected from in front of the radar detector 100, then only arrow segment 458 may be illuminated. However, a relatively strong signal detected in front of the radar detector 100 may result in arrow segments 458, 456, 454, and 452 all being illuminated. Alternatively, in that instance, only illuminating arrow segment 452 may also convey a similar indication of both the strong signal strength and the signal direction to the user. Additionally, just the outline of the arrow segments 458, 456, 454, and 452, instead of their respective interior regions could be illuminated to provide concurrent display of signal strength and signal direction information.

Figure 4D:
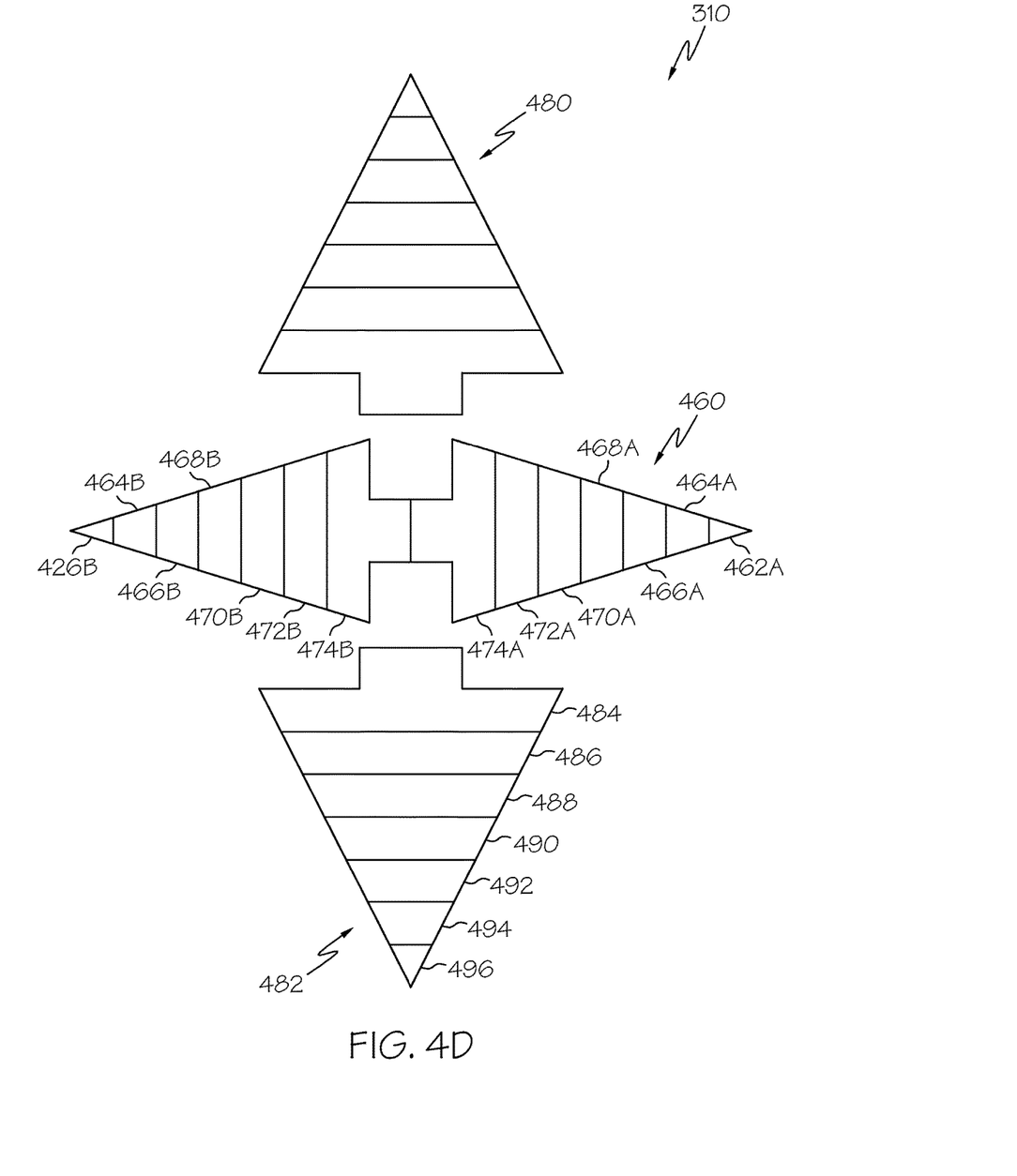

In some instances, it may be beneficial for a user to know that a detected radar signal is simply originating from one side or the other of the vehicle without necessarily knowing which particular side it is. In this instance, a combined display region 310, as shown in FIG. 4D can include a side visual indicator 460 that does not discriminate between the different sides of a vehicle. Thus, the combined display region 310 of FIG. 4D includes a side indicator 460, a front indicator 480, and a rear indicator 482. The front and rear indicators 480 and 482 are comprised of a number of different segments (e.g., 484-496). A similar indicator was described with respect to FIG. 4B, wherein the number of segments (e.g., 484-496) that are illuminated for a particular directional arrow reflect a signal strength level of a detected radar signal.

The side indicator 460, however, includes matched pairs of indictors segments. For example, a right segment 462A has a matching left segment 462B and another right segment 464A has a corresponding matching left segment 464B. Accordingly, the side indicator 460 includes right segments 462A-474A and respective matching left segments 462B-474B. When a detected radar signal is to one side or the other of the vehicle matching segments of the side indictor 460 are illuminated by the microprocessor 110 such that the particular segments (e.g., 462A-474A and 462B and 474B) which are active indicate a signal strength of the detected radar signal. For example, if a radar signal is detected to the right of the vehicle and has about a mid-level signal strength, then segments 468A, 468B, 470A, 470B, 472A, 472B, 474A, and 474B will be illuminated.

Figure 4E:
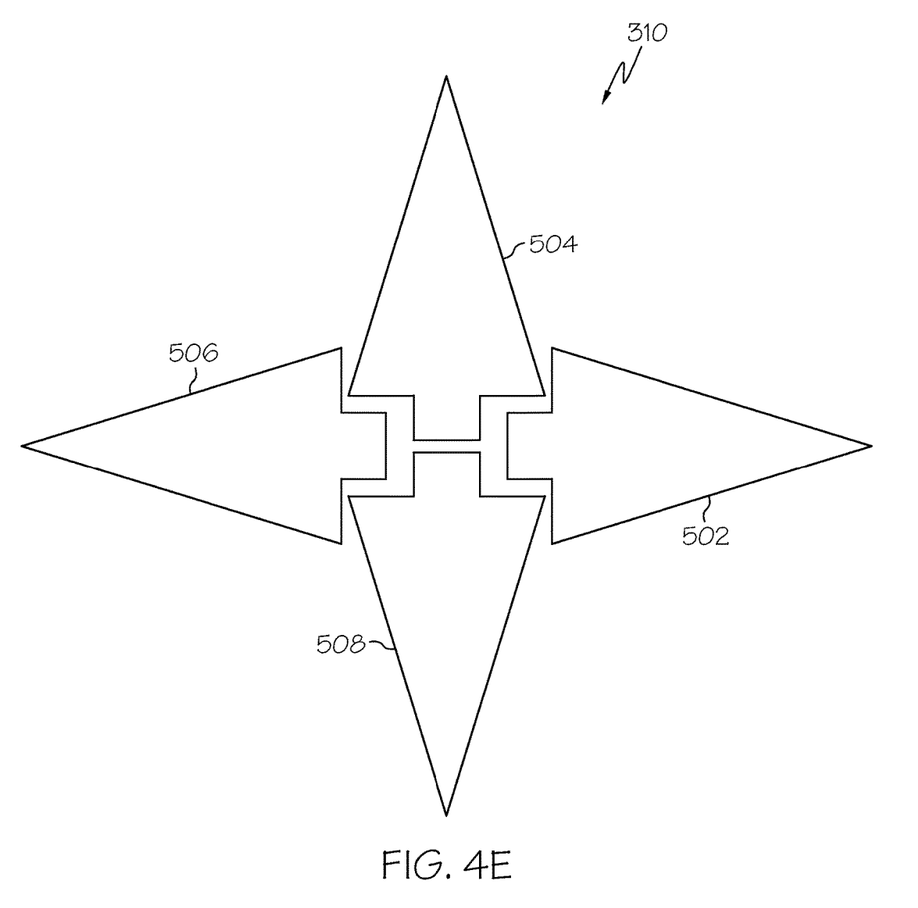

FIG. 4E depicts a combined display portion 310 in which there are four directional indicators 502, 504, 506, 508. In this example, the one directional indicator is illuminated, or made visible, by the microprocessor 110 that is indicative of the direction from which a detected radar signal originates. However, the directional indicators 502, 504, 506, 508 of FIG. 4E are multi-color visual elements and their color varies according to a signal strength of the detected radar signal. For example, the directional indicators 502, 504, 506, 508 may each be configured to be one of three colors (e.g., red, yellow, green) when activated. Based on the detected signal strength, the color of an activated directional indicator is controlled by the microprocessor 110 to indicate the signal strength. Thus, each directional indicator 502, 504, 506, and 508, when activated, provides a simultaneous visual indication of both the direction and strength of a detected radar signal.

In addition to, or instead of, different colors, the directional indicators 502, 504, 506, 508 of FIG. 4E may have a tint-level, or opacity, that varies according to a signal strength of the detected radar signal. For example, the directional indicators 502, 504, 506, 508 may each be configured so that it a) is faintly visible (or possibly comprise just an outline) when the detected signal strength is relatively low, b) is substantially opaque when the detected signal is near a maximum detectable strength level, and c) between the two extremes, has a tint level that varies between faintly visible to opaque depending on the detected signal strength. Thus, based on the detected signal strength, the tint-level, or opacity, of an activated directional indicator is controlled by the microprocessor 110 to indicate the signal strength. Accordingly, each directional indicator 502, 504, 506, and 508, when activated, provides a simultaneous visual indication of both the direction and strength of a detected radar signal.

Figure 4F:
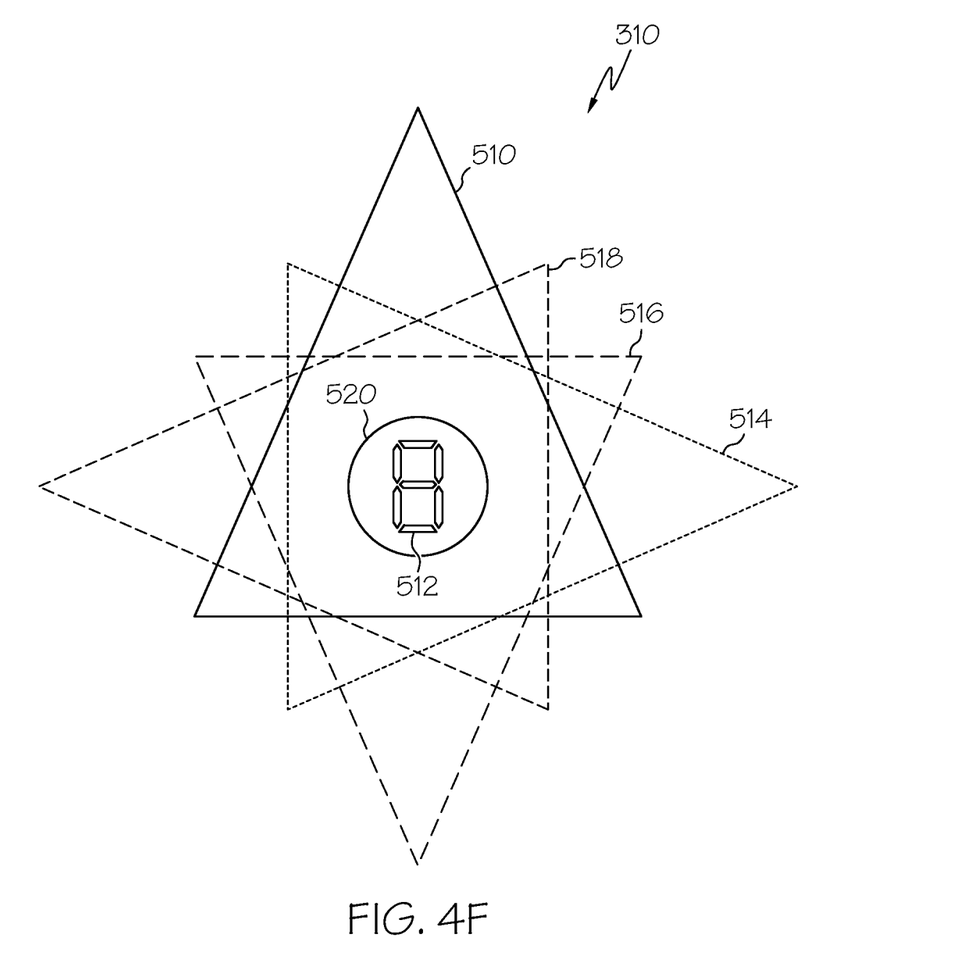

In the previous figures, for the sake of clarity, the different directional indicators were depicted such that they did not overlap one another. However, one of ordinary skill will recognize that various LED segments, LCD elements, lights, and display screens can be configured such that the indicator elements may overlap one another. For example, FIG. 4F depicts an example combined display region 310 in which there are four directional arrows 510, 514, 516, and 518 that at least partially overlap to create a common center portion 520. If the combined display region 310, for example, comprises a pixel-based display screen, then the outline of each of the arrows 510, 514, 516, and 518 encompasses the pixels that would be illuminated when one of those arrows were activated by the microprocessor 110. In addition to the arrows 510, 514, 516, and 518, the combined display region 310 also includes a visual indicator 512 that provides an indication of the signal strength of a detected radar signal. The visual indicator 512 is depicted in FIG. 4F as a 7-segment display located in the common center portion 520 but a bar graph or similar signal strength indicator could be utilized as well. In operation, one of the arrows 510, 514, 516, and 518 is activated to indicate a direction from which a detected radar signal originates and the 7-segment display 512 displays a value that is indicative of the signal strength of that detected radar signal.

Figure 5A:
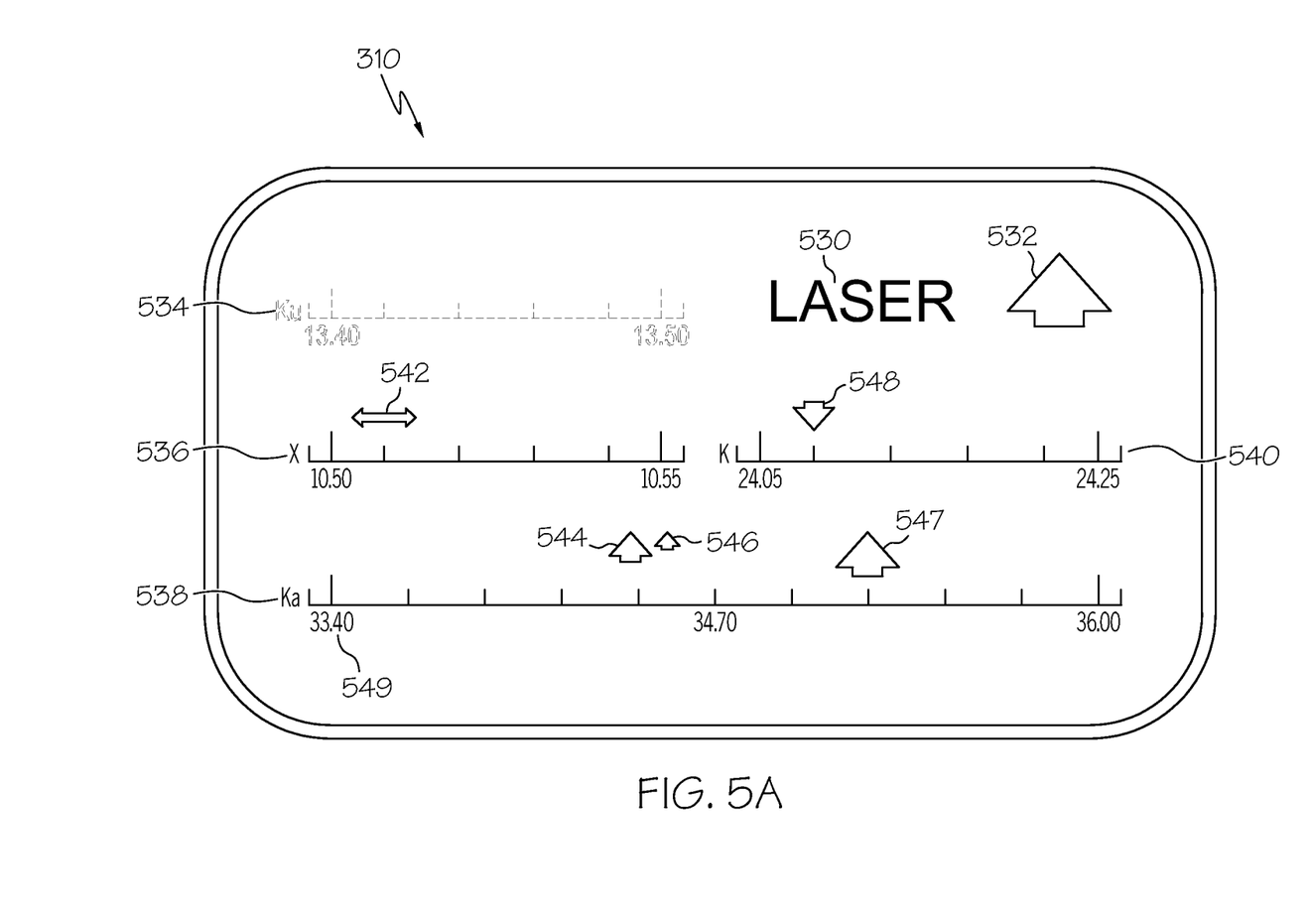
FIGS. 5A and 5B depict different concurrent displays of one or more signal strength indicators and signal direction indicators in a single portion of a display in accordance with the principles of the present invention.
Figure 5B:
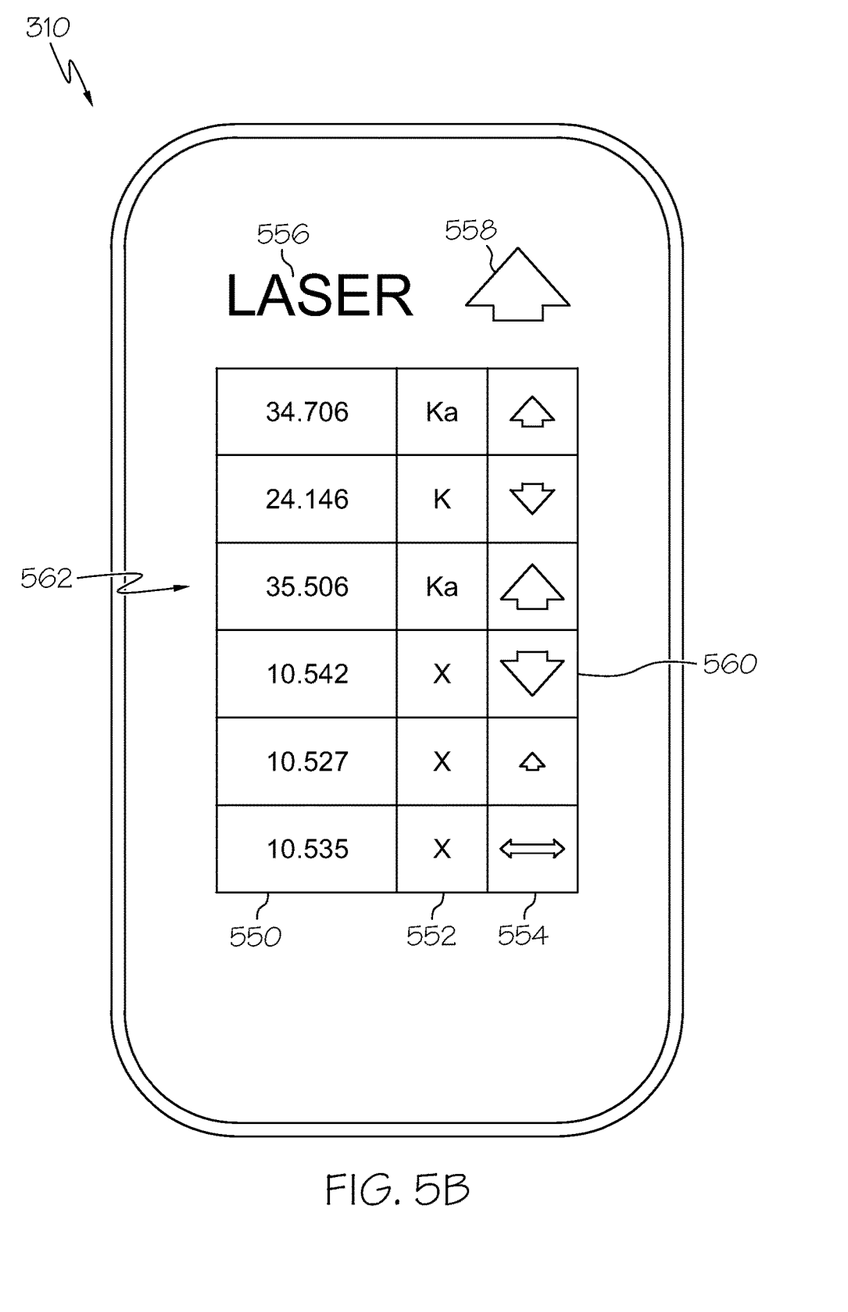

In some instances, there may be more than one detected radar signal present. FIG. 5A and FIG. 5B depict at least some examples of how the respective signal strength and signal direction of each of such multiple detected signals can be concurrently displayed.

In FIG. 5A, the combined display region 310 has a separate display portion for each radar band. The Ku band has a display scale 534, the X band has its display scale 536, the Ka band has its display scale 538 and the K band has its own display scale 540. Each of these display scales can have a respective legend (e.g., 549) that allows an operator to identify the frequencies associated with a particular radar band display scale. One or more of the bands may be disabled by the operator in which case the display scale and legend may be removed from the display. For example, in FIG. 5A, if the Ku band is disabled, its display scale 534 and legend may be removed from the display region 310 as indicated by showing the display scale 534 and its legend in dotted lines.

The combined display region 310 also has a portion that can highlight a particular band or signal type that is a priority as determined by the operator or by the radar detector. For example, in FIG. 5A, an indicator 530 reveals that a laser signal has been detected and an arrow icon 532 (e.g., by its size) indicates that the laser signal is relatively strong and (e.g., by its pointing direction) indicates that the laser signal is originating from the front of the vehicle.

In the combined display region 310 of FIG. 5A, there are no radar signals detected in the Ku band and so no icons are displayed that are associated with the display scale 534. However, there is one signal detected in the X band and, thus, a double headed arrow icon 542 showing signal strength and signal direction is displayed. The double headed icon 542 is located at a position of the display scale 536 that corresponds to its frequency within the X band. In particular, the icon 542 reveals that a radar signal of moderate strength was detected that originated from one side of the vehicle and that its frequency is about 10.51 GHz.

There was also one radar signal detected in the K band. The arrow icon 548 reveals that this radar signal is of moderate strength, originates from behind the vehicle and has a frequency of about 24.09 GHz. In the Ka band, there were three radar signals detected. The arrow icons 544, 546, 547 reveal that all three radar signals originated from in front of the vehicle and that a moderate strength signal was detected at about 34.64 GHz, a weak signal was detected at about 34.67 GHz, and a strong signal was detected at about 35.35 GHz.

FIG. 5B depicts a combined display region 310 in which the signal direction and signal strength of a plurality of different detected radar signals can be presented in a tabular format. A priority region can be included that indicates a signal type indicator 556 and signal direction and strength arrow icon 558 of a detected radar signal that is considered a priority as determined by the operator or by the radar detector. In particular, the size and direction of the arrow icon 558 in FIG. 5B can indicate that a strong laser signal was detected originating from in front of the vehicle.

A tabular region 562 of the display 310 can include multiple columns 550, 552, 554 and multiple rows. One example, row 560, is labeled in FIG. 5B. Each row of the tabular region 562 is associated with one of a plurality of detected radar signals and may include three columns of data. One column 550 may indicate a frequency of the detected radar signal while a second column 552 can indicate the particular radar band associated with that frequency. A third column 554 can provide an icon or indicator that concurrently indicates both a signal direction and signal strength associated with the detected radar signal. In this way, the operator can be visually presented with information about a plurality of different radar signals and easily determine, for each radar signal, its relative signal strength and originating direction as well as its frequency and band information.

Thus, as shown in FIGS. 5A and 5B, once the radar signal detector determines a signal strength of a police radar signal and a direction of a source of the police radar signal, the display portion can display an icon having a visual appearance which varies based on both the direction and on the signal strength. For example, the icon can have the appearance of an arrow, single headed or double headed, with its size varying based on the determined signal strength, and its pointing direction varying based on the direction of the source of the police radar signal.

In the above description, the example directional indicators were used to provide a visual indication to a driver of the direction of a source of the detected radar signal such as "in front of the vehicle", "to the side of the vehicle", and "to the rear of the vehicle". However, as described more fully in the incorporated patent, U.S. Pat. No. 5,151,701, the relative direction of the source of the detected radar signal can be determined with a much finer granularity. For example, 8, 10 or 12 directional arrows (instead of just 4) could be provided to indicate the direction from which a detected radar signal originates.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus comprising:
a radar signal detector configured to determine a signal strength of a police radar signal and a direction of a source of the police radar signal; and
a display in communication with the radar signal detector and configured to provide a single display region having a visual appearance, when activated, which varies based on both the direction and on the signal strength;
wherein the single display region comprises:
a first visual indicator configured to be activated when the direction is in front of the apparatus;
a second visual indicator configured to be activated when the direction is to a rear of the apparatus; and
a third visual indicator configured to be activated when the direction is to a side of the apparatus; and
wherein a respective size of the first, second, and third visual indicators, when activated, varies based on the signal strength.

2. The apparatus of claim 1, wherein each of the first, second, and third visual indicators comprise a respective plurality of segments.

3. The apparatus of claim 2, wherein when one of the first, second, and third visual indicators is activated, a number of the respective plurality of segments is activated and the number varies based on the signal strength.

4. The apparatus of claim 1, wherein:
the first visual indicator comprises a first arrow pointing in a first direction substantially in front of the apparatus;
the second visual indicator comprises a second arrow pointing in a second direction substantially to the rear of the apparatus; and the third visual indicator comprises a third arrow pointing in a third direction to the side of the apparatus.

5. The apparatus of claim 1, wherein a respective color of the first, second, and third visual indicators, when activated, varies based on the signal strength.

6. A method for displaying a plurality of attributes of detected radar signal comprising:
determining a signal strength of the detected radar signal and a direction of a source of the detected radar signal; and
displaying a visual indication of the plurality of attributes of the detected radar signal in a single display region having a visual appearance, when activated, which varies based on both the direction and on the signal strength;
wherein displaying the visual indication comprises:
activating a first visual indicator when the direction is to a front;
activating a second visual indicator when the direction is to a rear; and
activating a third visual indicator when the direction is to a side, and
wherein a respective size of the first, second, and third visual indicators, when activated, varies based on the signal strength.

7. The method of claim 6, wherein each of the first, second, and third visual indicators comprise a respective plurality of segments.

8. The method of claim 7, wherein when one of the first, second, and third visual indicators is activated, a number of the respective plurality of segments is activated and the number varies based on the signal strength.

9. The method of claim 6, wherein a respective color of the first, second, and third visual indicators, when activated, varies based on the signal strength.

10. The method of claim 6, wherein a respective opacity of the first, second, and third visual indicators, when activated, varies based on the signal strength.

11. An apparatus comprising:
a radar signal detector configured to determine a signal strength of a police radar signal and a direction of a source of the police radar signal; and
a display in communication with the radar signal detector and configured to display an icon having a visual appearance, when activated, which varies based on both the direction and on the signal strength, wherein the icon comprises an arrow having a size that varies based on the signal strength, and a pointing direction that varies based on the direction of the source of the police radar signal.

12. The apparatus of claim 11, wherein the radar signal detector is further configured to determine a frequency of the police radar signal; and
wherein the display comprises a frequency-band display bar having a first end corresponding to a first frequency and a second end corresponding to a second frequency, and wherein the icon is located at a position, within the display bar between the first end and the second end, corresponding to the frequency of the police radar signal.

* * * * *

UNITED STATES PATENT AND TRADEMARK OFFICE
CERTIFICATE OF CORRECTION

PATENT NO. : 10,261,171 B2
APPLICATION NO. : 14/827768
DATED : April 16, 2019
INVENTOR(S) : Valentine et al.

Page 1 of 1

It is certified that error appears in the above-identified patent and that said Letters Patent is hereby corrected as shown below:

In the Specification

Column 3, Line 40, "circuit 106. The switching circuit 16 can connect" should read --circuit 106. The switching circuit 106 can connect--

Column 5, Line 27, "In operation, the microprocessor 100 of the radar detector" should read --In operation, the microprocessor 110 of the radar detector--

Column 6, Line 60, "particular segments (e.g., 462A-474A and 462B and 474B)" should read --particular segments (e.g., 462A-474A and 462B-474B)--

Signed and Sealed this
Thirteenth Day of August, 2019

Andrei Iancu
*Director of the United States Patent and Trademark Office*